(No Model.)
M. KROELL.
NUT LOCK.
No. 454,364. Patented June 16, 1891.
Fig. I.
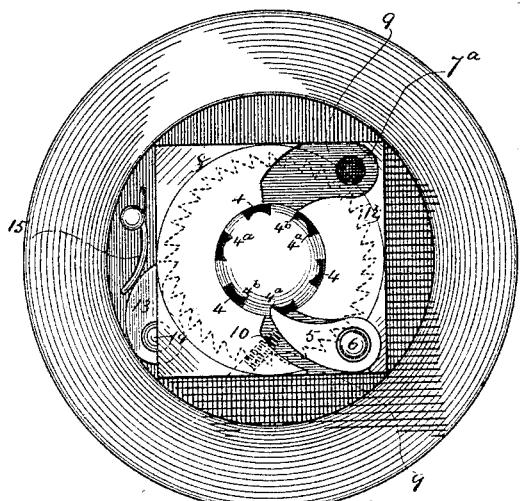
Fig. III.
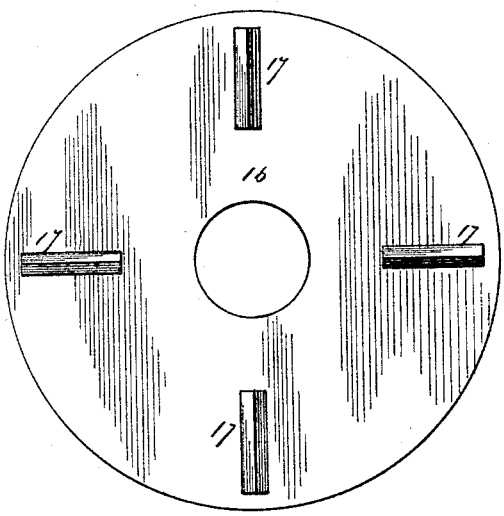
Fig. II.
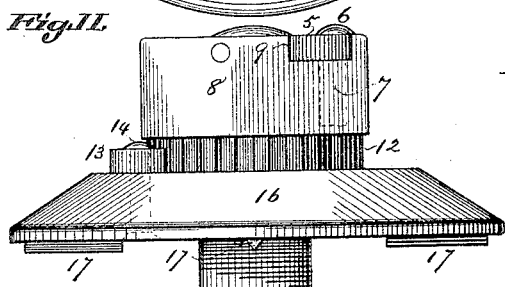
Fig. IV.
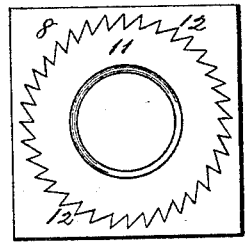
Fig. V.
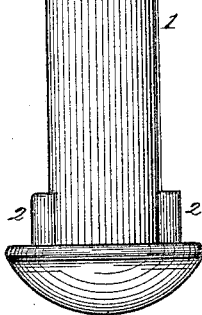
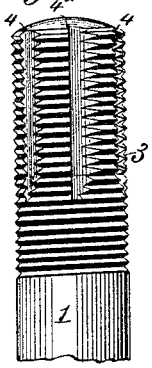
Fig. VI.
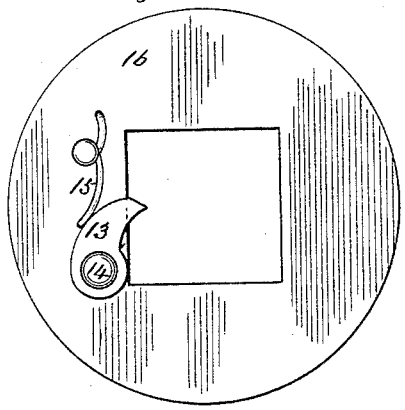
Attest:
Geo. E. Cruel.
S. Cotton
Inventor:
Marzell Kroell.
By Knight Bro.
Attys.
THE NORRIS PETERS CO., PHOTO-LITHO., WASHINGTON, D. C.

UNITED STATES PATENT OFFICE.

MARZELL KROELL, OF ST. CHARLES, MISSOURI.

NUT-LOCK.

SPECIFICATION forming part of Letters Patent No. 454,364, dated June 16, 1891.

Application filed March 13, 1891. Serial No. 384,908. (No model.)

*To all whom it may concern:*

Be it known that I, MARZELL KROELL, of St. Charles, in the county of St. Charles and State of Missouri, have invented a certain new and useful Improvement in Nut-Locks, of which the following is a full, clear, and exact description, reference being had to the accompanying drawings, forming part of this specification.

This is a device intended for locking the nut, and in its more perfect form the bolt also. The features of novelty are set forth in the claims.

Figure I is an end view of the device. Fig. II is a side view of the same. Fig. III is an inside view of the locking-washer. Fig. IV is an inside view of the nut. Fig. V is a detail side view showing the screw-threaded part of the bolt. Fig. VI is an outside view of a locking-washer, showing a modification.

1 is the bolt, which may have wings 2 or equivalent non-circular form at head end to prevent its turning. The whole or a part of the screw-threaded portion 3 of the bolt has one or more notches 4, that may have a single inside angle $4^a$, as seen in Fig. V, or two inside angles $4^a$ and $4^b$, as seen in Fig. I, according to the purpose of said notches. Where it is intended to prevent the turning of the bolt in only one direction, either to the left or right, the notches are made with a single inside angle at the right or left side of the notch; but where it is desired to make the bolt so that it may be prevented from turning either way, as required, the notches have two inside angles, used with pawls 5 in different positions. The angles 4 $4^a$ receive the points of the pawl when it is desired to prevent the bolt turning to the right, and in this case the pawl 5 is in the position shown in full lines in Fig. I, the pawl turning on a pin 6, inserted in a hole in the nut 8, whose position is indicated by broken lines at 7, Fig. II.

9 is a recess in the nut 8, in which the pawl works. When it is desired to prevent the turning of the bolt to the left, the pin 6 is placed in the pin-hole $7^a$ and the pawl is inverted upon the pin, so that the concave curve shall be at the inside, as before, and the point of the pawl will enter the angle $4^b$. In the latter case the bolt will be prevented from unscrewing in the nut, and if the nut is held fast the bolt cannot be turned, except to the right, which would tighten the connection. It is assumed that the bolt has a right-hand thread.

10 is a spring pressing against the outer side of the pawl 5 to hold the pawl in engagement with the bolt.

11 is a circular extension at the inner side of the nut, whose periphery is formed in ratchet-teeth 12, engaged by a pawl 13, pivoted at 14 to the washer 16. The washer has one or more radial ribs 17 upon its inner face, four ribs being shown. When these ribs bear against a wooden or other compressible surface, they are embedded in it and the washer restrained from turning. The pawl 13 is pushed against the ratchet-teeth by a spring 15. Where the inner face of the washer bears against metal, the ribs 17 may be removed or recesses may be made in the metal to receive the ribs.

Where the construction and arrangement are as seen in Figs. I to IV, the bolt is restrained from turning by the wings or projections 2. The washer is restrained from turning by the ribs 17, and the nut restrained from turning on the bolt by the pawls 13 and 5, so that the nut cannot be turned in either direction. This construction is useful where it is not desired that the parts shall be pressed together with more than a given pressure—for instance, where the bolt acts the part of a pintle on which another part turns. When the bolt is made cylindrical to the head and has no projections 2 and the pawl-pin 6 is inserted in the pin-hole $7^a$, the end of the pawl 5 engages in the angles $4^b$ of the notches 4. Supposing the pawl 5 to be in the position seen in Figs. I and II, and it is required that the nut be turned forward, the pawl is drawn up out of engagement with the notches 4, and when the nut is sufficiently tight the pawl is pushed into engagement with the notch 4, preventing the forward turning of the nut, while the pawl 13 prevents the backward turning of the nut. When the pawl-pin is in the pin-hole $7^a$, the nut may be turned forward without disengagement of the pawl.

In the modification shown in Fig. VI the washer 15 is made to fit a square-shanked bolt, the washer in this case being restrained from turning by the shape of the bolt.

I claim as my invention—

1. The combination, in a nut-lock, of the washer 16, with spring-pawl 13, the nut 8, with annular ratchet 11 12 and pawl 5, and the bolt 1, having recesses 4, all substantially as and for the purpose set forth.

2. The combination, in a lock-nut, of a bolt with recesses 4, a washer 16, with spring-pawl 13, and a nut with ratchet portion 11 and provision for two oppositely-acting pawls 5, substantially as set forth.

3. The combination, in a nut-lock, of a bolt with recesses 4, a washer 16, with ribs 17 and pawl 13, and a nut having the ratchet 11 12 and a pawl 5, adapted to engage in the recesses 4, substantially as set forth.

MARZELL KROELL.

Witnesses:
J. PHIL. HOEHN,
HENRY BUENEMOXIM.